United States Patent [19]
Bell, III et al.

[11] Patent Number: 5,105,625
[45] Date of Patent: Apr. 21, 1992

[54] MOUNTING FOR A CERAMIC SCROLL IN A GAS TURBINE MACHINE

[75] Inventors: Albert H. Bell, III, Birmingham; Dan Coffey, Troy, both of Mich.

[73] Assignee: General Motors Corporation, Detroit, Mich.

[21] Appl. No.: 618,338

[22] Filed: Nov. 23, 1990

[51] Int. Cl.⁵ .............................................. F02C 3/04
[52] U.S. Cl. ...................................... 60/753; 60/39.83
[58] Field of Search .................... 60/753, 39.32, 39.83, 60/39.31, 752; 416/241 B, 244 A

[56] References Cited

U.S. PATENT DOCUMENTS

| | | | |
|---|---|---|---|
| 3,943,703 | 3/1976 | Kronogard | 416/244 A |
| 3,999,376 | 12/1976 | Jeryan et al. | 416/241 B |
| 4,326,835 | 4/1982 | Wertz | 416/241 B |
| 4,363,208 | 12/1982 | Hoffman et al. | 60/753 |
| 4,373,326 | 2/1983 | Smale | 60/39.161 |
| 4,639,194 | 1/1987 | Bell, III et al. | 416/241 B |
| 4,688,378 | 8/1987 | Harris | 60/39.32 |
| 4,748,806 | 6/1988 | Drobny | 60/752 |
| 4,840,026 | 6/1989 | Nash et al. | 60/39.32 |
| 4,907,743 | 3/1990 | Bouiller et al. | 60/39.32 |
| 4,942,732 | 7/1990 | Priceman | 60/753 |

OTHER PUBLICATIONS

Richardson, W. D. et al., "Contact Stress and Coefficient of Friction Effects on Ceramic Interfaces". 7th LBL/MMRD International Materials Symposium, Aug. 1980 pp. 661–2, 674–5.

Sugunama et al., "Effect of Interlayers in Ceramic-Metal Joints with Thermal Expansion Mismatches". Communications of the American Ceramic Society, Dec. 1984, pp. 256–257.

*Primary Examiner*—Richard A. Bertsch
*Assistant Examiner*—Timothy S. Thorpe
*Attorney, Agent, or Firm*—Saul Schwartz

[57] ABSTRACT

In a gas turbine engine, an annular flange of a ceramic scroll is clamped to an annular shoulder of a gas turbine engine housing by a plurality of nuts on thread rods extending perpendicular to the annular shoulder. A metal sleeve around each rod cooperates therewith in defining a coolant passage which is connected at one end to a source of compressed air and which discharges at the other end into a cooling chamber around the nuts through grooves in a surface of each nut. Air circulating in the coolant passages and through the cooling chamber cools and thermally shields the rods and the nuts.

5 Claims, 2 Drawing Sheets

MOUNTING FOR A CERAMIC SCROLL IN A GAS TURBINE MACHINE

FIELD OF THE INVENTION

This invention relates to a mounting for a ceramic scroll on a metal engine block or housing of a gas turbine engine.

BACKGROUND OF THE INVENTION

In hot sections of gas turbine engines where gas temperatures may exceed 2500 degrees F., ceramic, which does not require air cooling for acceptable durability, is preferable to alloy metal which does. A scroll, for example, defining the transition from the discharge of a combustor can to an annular nozzle is an ideal candidate for substitution of ceramic for alloy metal. Mounting a ceramic scroll on a metal engine block, however, is challenging because of the different physical properties, including thermal expansion characteristics, of the two materials. A mounting according to this invention affords a relatively simple and effective connection between a ceramic scroll and a metal engine block in a gas turbine engine.

SUMMARY OF THE INVENTION

This invention is a new and improved mounting for a ceramic scroll on a metal engine block of a gas turbine engine. The scroll mounting according to this invention includes an annular shoulder on the engine block and an annular ceramic flange on the scroll having a plurality of clearance slots therein. The ceramic flange is clamped against the annular shoulder with a crushable member between the two for cushioning. The clamping apparatus includes a plurality of steel sleeves extending through the holes in the ceramic flange and a plurality of bolt-like fasteners within the sleeves which screw into thread holes in the annular shoulder. In each sleeve, the annulus between the sleeve and the fastener therein defines a passage for cooling air which flows from the threaded end of the fastener to the head end thereof. The head ends are relieved to permit flow of the cooling air out of the passages into a cooling chamber around the fastener heads which cooling air thermally shields the heads. The cooling chamber is vented to the hot gas flow path of the engine for discharge of the cooling air into the hot gas stream therein. In a preferred embodiment, zirconia thermal barriers are provided to minimize heat transfer from the annular ceramic flange to the sleeves and to the engine block.

DESCRIPTION OF A PREFERRED EMBODIMENT

Figure 1:
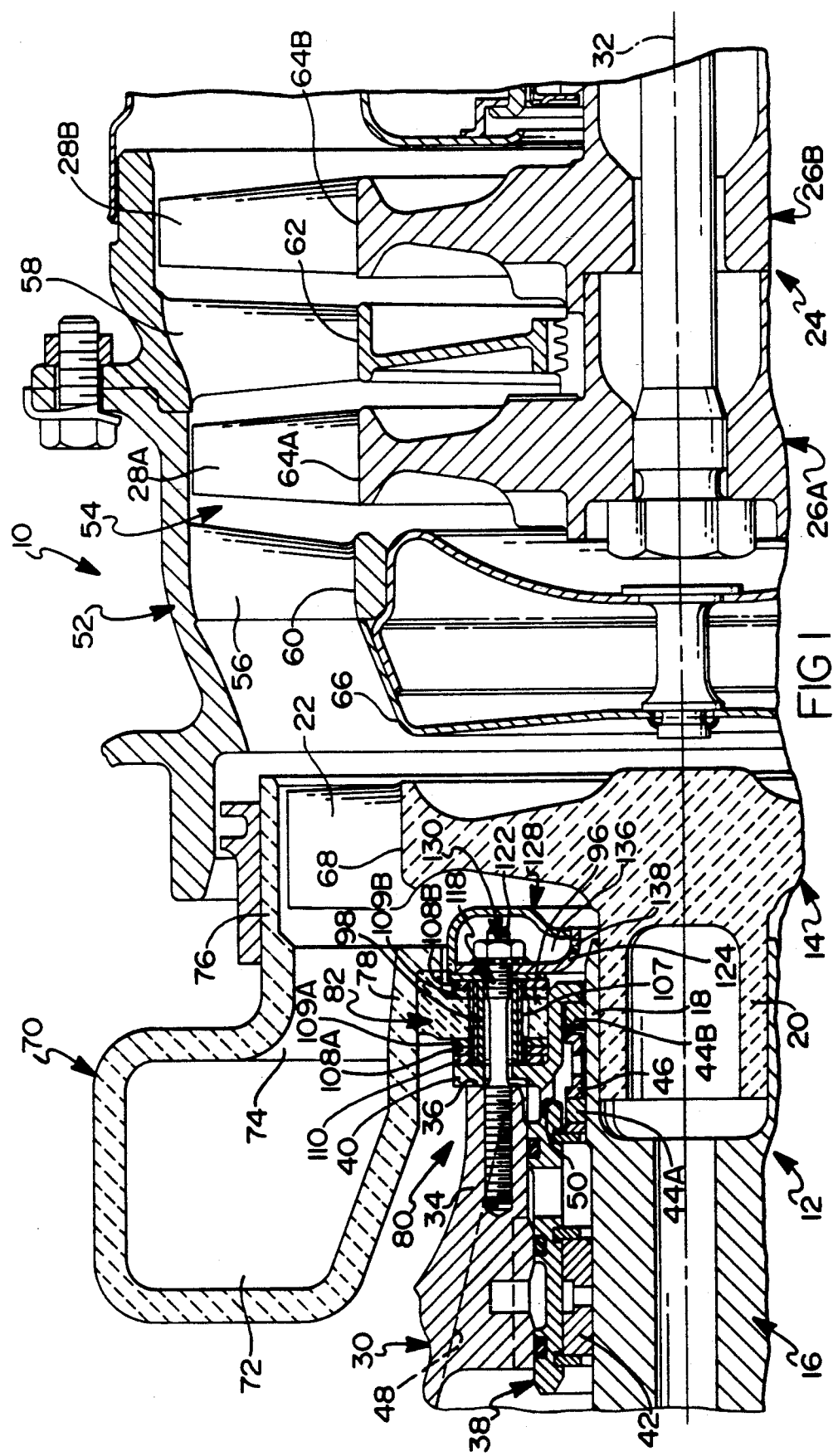
FIG. 1 is a fragmentary elevational view of the hot section of a gas turbine engine having a ceramic scroll mounting according to this invention and taken on the longitudinal centerline of the engine.

Referring to FIG. 1, a partially illustrated hot section (10) of a gas turbine engine includes a single stage gasifier turbine rotor (12) which may be as described in U.S. Pat. No. 4639194, issued 6/27/87 to A. H. Bell III, et al and assigned to the assignee of this invention. The gasifier turbine rotor includes a ceramic turbine wheel (14) and an alloy steel shaft (16). A tubular end (18) of the alloy steel shaft is shrink fitted on a tubular stem (20) of the gasifier turbine wheel. The turbine wheel (14) has a stage (22) of turbine blades around its circumference.

The hot section (10) further includes a power turbine rotor (24) having a pair of turbine wheels (26A-B). Each of the turbine wheels (26A-B) has a stage of turbine blades (28A-B), respectively, around its circumference. The power turbine rotor (24) is supported on a fragmentarily illustrated engine block (30) of the gas turbine engine for rotation about a primary axis (32) of the engine. A representative arrangement for mounting the power turbine rotor on the engine block is described in U.S. Pat. No. 4825645, issued 5/2/89 to A. H. Bell III and assigned to the assignee of this invention.

The engine block is made of alloy metal and has a structurally rigid cylindrical wall (34) aligned on the primary axis (32). The cylindrical wall terminates at an annular shoulder (36) in a plane perpendicular to the primary axis. A generally tubular, cast iron carrier (38) is disposed in the cylindrical wall (34) with a radial annular flange (40) of the carrier seating against the annular shoulder (36).

A sleeve bearing (42) between the carrier (38) and the alloy steel shaft (16) supports the gasifier turbine rotor on the engine block for rotation about the primary axis (32). A pair of high temperature seal rings (44A-B) are disposed between the carrier (38) and the alloy steel shaft (16) and are separated by a tubular spacer (46). A schematically illustrated plenum (48) in the engine block is connected to a source of cooling air, not shown, such as the compressor of the engine. A plurality of circumferentially spaced holes (50) in the carrier conduct cooling air from the plenum (48) to the high temperature seal rings (44A-B).

An interior structural wall (52) of the engine defines the radially outer side of an annular hot gas motive fluid flow path (54) in which the turbine blades (22),(28A-B) are all disposed. A first stage of stator vanes (56) connected to the wall (52) is disposed upstream of the power turbine blades (28A) and a second stage of stator vanes (58) connected to the wall (52) is disposed between the power turbine blades (28A-B). Downstream of the stator vane stage (56), the radially inner side of the hot gas flow path (54) is defined by respective ones of a plurality of platforms (60),(62) and (64A-B) on the stator vanes (56),(58) and turbine blades (28A-B), respectively. Upstream of the stator vane stage (56), the inside of the hot gas flow path is defined by a shield (66) on the engine block and by respective one of a plurality of platforms (68) on the gasifier turbine blades (22).

A fragmentarily illustrated ceramic scroll (70) of the gas turbine engine includes a volute chamber (72) centered around the primary axis (32). The volute chamber is in fluid communication with a combustor, not shown, of the engine which discharges hot gas motive fluid into the volute chamber (72) generally tangent to a circle around the primary axis (32) in a plane perpendicular thereto so that a circular flow of motive fluid is established in the volute chamber.

The scroll (70) further includes an annular nozzle (74) defined between a generally cylindrical outer wall (76) of the scroll (70) and a generally cylindrical inner wall (78) of the scroll. The nozzle (74) is centered around the primary axis (32) and discharges motive fluid from the volute chamber into the annular hot gas flow path (54)

upstream of the gasifier turbine blades (22). The ceramic scroll (70) is connected to the cylindrical wall (34) of the engine block by a mounting (80) according to this invention.

Figure 3:
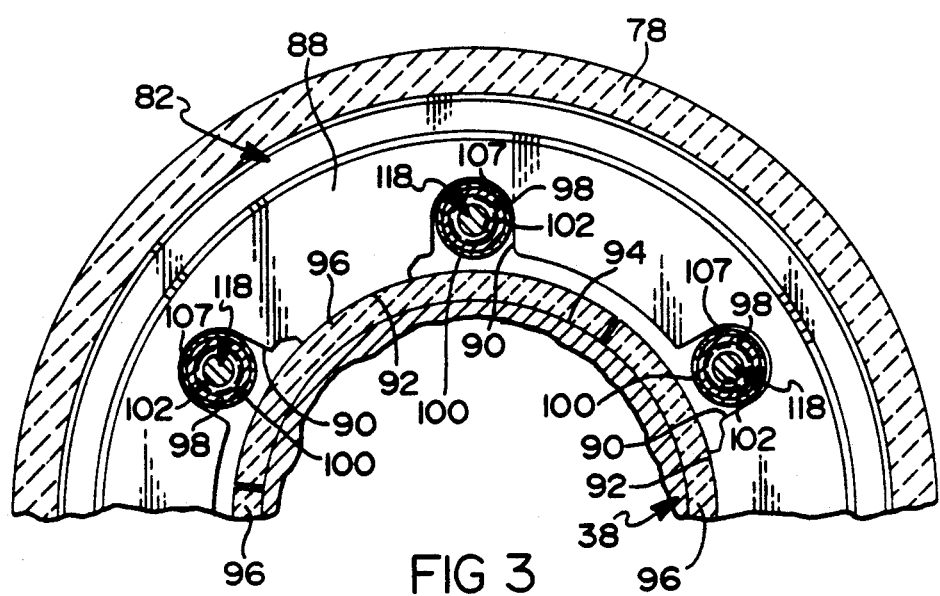
FIG. 3 is a reduced, fragmentary sectional view taken generally along the plane indicated by lines 3—3 in FIG. 2.

The scroll mounting (80) includes an annular ceramic flange (82) in a plane perpendicular to the primary axis (32). The flange (82) is integral with or bonded to the cylindrical inner wall (78) of the scroll (70) and has a first side (84) facing an opposing and parallel surface (86) of the flange (40) on the carrier (38) and a second side (88) facing the gasifier turbine wheel (14). The ceramic flange (82) has a plurality of inward opening, angularly spaced radial notches or slots (90) and is relieved between respective pairs of slots so that a plurality of pads (92), FIG. 3, are defined on the ceramic flange. The ceramic flange (82) is disposed around a cylindrical surface (94) of the carrier (38) with the pads (92) radially spaced from the surface. A plurality of arc shaped ceramic spacers (96) are disposed between the surface (94) and the pads (92) and effectively center the ceramic flange (82), and hence the scroll (70), around the primary axis (32).

The mounting (80) further includes a plurality of tubular alloy steel sleeves (98) projecting through respective ones of the slots (90) perpendicular to the annular shoulder (36) and to the ceramic flange (82). As seen best in FIG. 2, each sleeve has an outside surface (100), an inside surface (102), an annular inboard end (104), and an annular outboard end (106). The outside surface (100) of each sleeve has a thermal barrier layer or coat (107) of zirconia or other suitable insulating material to a depth of about 0.020 inch.

A pair of annular alloy metal plates (108A-B) on opposite sides of the ceramic flange (82) are perforated to receive therethrough respective ones of the sleeves (98). Each of the plates (108A-B) has a thermal barrier layer or coat (109A-B), FIG. 2, of zirconia or other suitable insulating material to depth of about 0.040 inch on the side thereof facing the ceramic flange. An annular crushable member (110) is disposed between the annular plate (108A) and the flange (40) on the carrier (38) and is perforated to receive therethrough respective ones of the sleeves (98).

The inside surfaces (102) of the sleeves (98) register with corresponding ones of a plurality of the holes (112) in the carrier flange (40). The holes (112), in turn, register with corresponding ones of a plurality of threaded bores (114) in the cylindrical wall (34) of the engine block perpendicular to the plane of the annular shoulder (36). Respective ones of a plurality of notches (116) in an inboard side of the carrier flange (40) afford communication between the plenum (48) and the inside surfaces (102) of the sleeves (98) through the corresponding holes (112) in the carrier flange.

A plurality of threaded rods (118) extend through respective ones of the sleeves (98) and the aligned holes (112) in the carrier flange (40) and are screwed into respective ones of the threaded bores (114) in the cylindrical wall (34) of the engine block. The diameter of each rod (118) is less than the diameter of the corresponding hole (112) and less than the diameter of the inside surface (102) of the corresponding sleeve (98). Accordingly, an annular passage (120), FIG. 2, is defined inside each sleeve (98) around the corresponding threaded rod extending from the plenum (48) toward an outboard end (122) of the rod.

Figure 2:
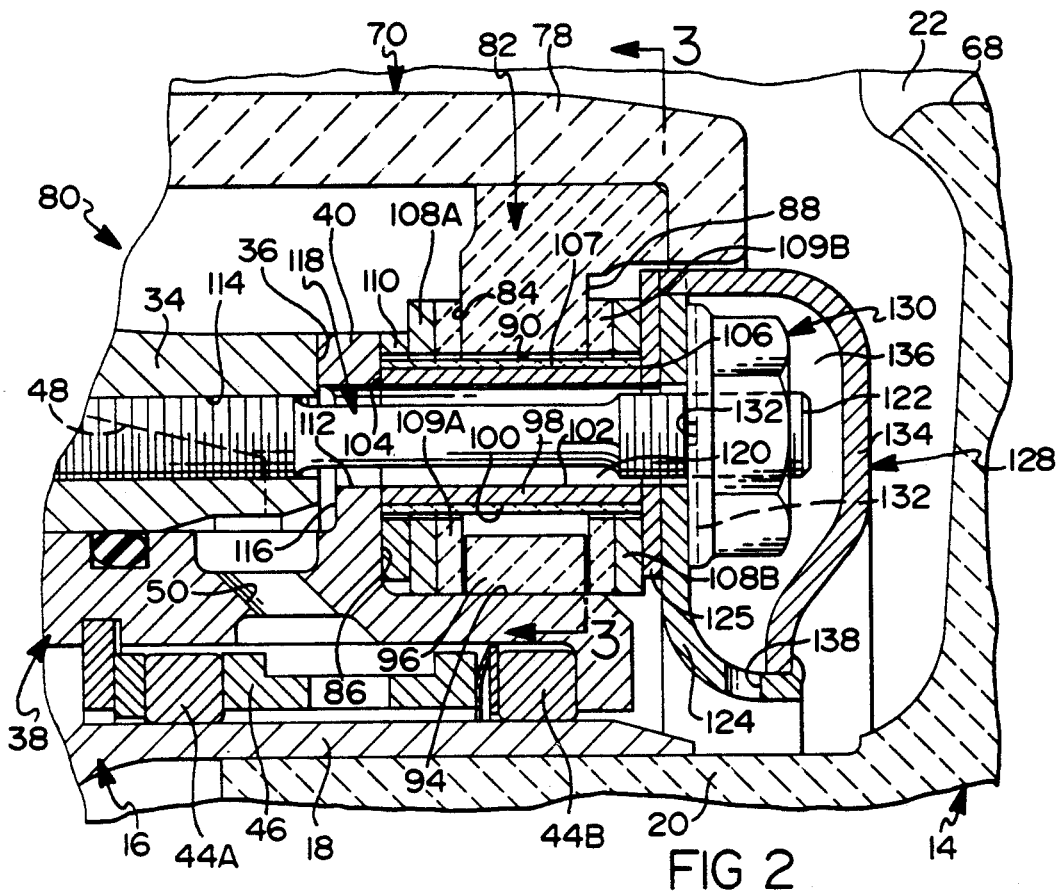
FIG. 2 is an enlarged view of a portion of FIG. 1.

As seen best in FIGS. 1-2, an annular metal end plate (124) outboard of the plate (108B) is perforated to receive therethrough respective ones of the rods (118). The end plate (124) has a thermal barrier layer or coat (125) of zirconia or the like on the side facing the plate (108B) to a depth of about 0.040 inch. The end plate abuts the outboard ends (106) of the sleeves (98) and the plate (108B). The holes in the end plate (124) are about the same diameter as the inside surfaces (102) of the sleeves (98) so that the passages (120) extend through the end plate (124).

A plurality of nuts (130) are threaded on respective ones of the outboard ends (122) of the rods (118) outboard of the end plate (124). Each nut has an inner surface abutting the end plate (124) and a plurality of grooves (132) in the inner surface each of which intersects the threaded hole in the center of the corresponding nut. It is contemplated that bolts having heads with grooves corresponding to the grooves (132) could be substituted for the rods (118) and nuts (130).

An annular metal cover (134) attaches to the end plate (124) at a plurality of interfitting tangs, not shown, or the like whereby an annular cooling chamber (136) is defined between the cover and the end plate. The cooling chamber (136) envelops the nuts (130) and communicates with the hot gas flow path (54) through a plurality of bleed orifices (138) in the end plate (124) and through a clearance between the gasifier turbine wheel (14) and the annular nozzle (74). The grooves (132) in the inner surfaces of the nuts open into the cooling chamber (136).

The sleeves (98) function as spacers when the nuts (130) are tightened on the rods (118) to clamp the ceramic flange (82) to the annular shoulder (36) of the engine block. That is, as the nuts are tightened, the stack consisting of the ceramic flange, the annular plates (108A-B) and the crushable member (110) are progressively more tightly clamped between the nuts (130) and the annular shoulder (36). Simultaneously, the inboard ends (104) of the sleeves (98) are urged toward the carrier flange (40).

Normally, the nuts (130) are tightened to a predetermined torque level corresponding to a clamping load on the ceramic flange sufficient to operatively mount the scroll on the engine block but not so great as to damage the ceramic. In that condition, the inboard ends (104) of the sleeves are separated from the surface (86) carrier flange (40). If the nuts are overtorqued, the inboard ends (104) of the sleeves are driven against the surface (86). In that condition, further tightening of the nuts is effectively foreclosed and the clamping load on the ceramic flange limited. Accordingly, the integrity of the ceramic flange (82) is protected by careful control of the lengths of the sleeves (98), a relatively simple manufacturing technique.

Regarding cooling and thermal insulation, the thermal barrier coats on the sleeves (98), the annular plates (108A-B), and the end plate (124) minimize direct conduction of heat from the scroll (70) to the metal parts of the gas turbine engine such as the carrier (38) and the cylindrical wall (34) of the engine block. In addition, air flowing in the passages (120) around the rods (118) from the plenum (48) to the chamber (136) thermally shields and cools the rods an the nuts (130) to limit the temperatures thereof to levels compatible with long term structural reliability.

What is claimed is:

1. A mounting between a metal engine block of a gas turbine engine and an annular ceramic scroll aligned on a primary axis of said engine block comprising:

means defining an annular shoulder on said engine block in a plane perpendicular to and centered around said primary axis, means on said scroll defining an annular ceramic flange centered on said primary axis, clamp means for clamping said annular ceramic flange to said annular shoulder including a metal sleeve extending perpendicular to said annular shoulder and having an inboard end facing said annular shoulder in spaced relation thereto and an outboard end opposite said inboard end, means defining a slot in said annular ceramic flange through which said said metal sleeve projects, a crushable member around said metal sleeve between said annular shoulder and said ceramic flange, and fastener means including a rod extending through said metal sleeve for rigid attachment to said engine block perpendicular to said annular shoulder and a head connected to said rod outboard of each of said ceramic flange and said outboard end of said metal sleeve whereby rotation of said head relative to said annular shoulder urges said ceramic flange toward said crushable member and said inboard end of said metal sleeve toward said annular shoulder, an annular passage being defined in the clearance between said rod and said metal sleeve and said inboard end of said metal sleeve engaging said annular shoulder to foreclose further rotation of said head of said fastener means to limit clamping forces applied to said ceramic flange, means conducting coolant to said annular passage generally at said inboard end of said metal sleeve, and means defining a coolant discharge connected to said annular passage and located between said ceramic flange and said head of said fastener means.

2. The mounting recited in claim 1 and further including:

means defining a cooling chamber around said head of said fastener means having a bleed orifice therein, and means connecting said coolant discharge to said cooling chamber so that coolant from said annular passage circulates through said cooling chamber and out through said bleed orifice to cool and thermally shield said rod and said head of said fastener means.

3. The mounting recited in claim 2 wherein said coolant is pressurized air.

4. The mounting recited in claim 2 and further including:

a first perforated metal plate around said metal sleeve between said ceramic flange and said crushable member, a second perforated metal plate around said metal sleeve between said ceramic flange and said head of said fastener means, and means defining a thermal barrier coat on an outside surface of said metal sleeve and on a surface of each of said first and said second metal plates facing said ceramic flange for minimizing heat transfer from said ceramic flange to said metal sleeve and to each of said first and said second metal plates.

5. The mounting recited in claim 4 wherein:

each of said thermal barrier coats is a layer of zirconia.

* * * * *